United States Patent [19]

McLagan et al.

[11] Patent Number: 5,050,067

[45] Date of Patent: Sep. 17, 1991

[54] MULTIPLE SLIDING REGISTER STACKS IN A COMPUTER

[75] Inventors: Angus McLagan, Newport Beach; Gei-Jon Pao, Garden Grove; Chong S. Un, Anaheim, all of Calif.

[73] Assignee: Davin Computer Corporation, Irvine, Calif.

[21] Appl. No.: 489,722

[22] Filed: Feb. 27, 1990

Related U.S. Application Data

[63] Continuation of Ser. No. 88,616, Aug. 20, 1987, abandoned.

[51] Int. Cl.⁵ .............................................. G06F 7/00
[52] U.S. Cl. .................................... 364/200; 364/247; 364/244.3; 364/245.8; 364/245.9; 364/253.2; 364/253.3; 364/254.5; 364/280; 364/280.8
[58] Field of Search ... 364/200 MS File, 900 MS File

[56] References Cited

U.S. PATENT DOCUMENTS

| | | | |
|---|---|---|---|
| 3,882,455 | 5/1975 | Heck et al. | 364/200 |
| 4,229,790 | 10/1980 | Gilliland et al. | 364/200 |
| 4,435,780 | 3/1984 | Herrington et al. | 364/900 |
| 4,462,073 | 7/1984 | Grondalski | 364/200 |
| 4,486,827 | 12/1984 | Shima et al. | 364/200 |
| 4,627,024 | 12/1986 | Whalen et al. | 364/900 |
| 4,648,035 | 3/1987 | Fava et al. | 364/200 |
| 4,658,351 | 4/1987 | Teng | 364/200 |
| 4,658,353 | 4/1987 | Whittaker et al. | 364/200 |
| 4,709,328 | 11/1987 | Anthony, Jr. et al. | 364/200 |
| 4,901,233 | 2/1990 | Liptay | 364/200 |

OTHER PUBLICATIONS

Manolis G. H. Katavenis, "Reduced Instruction Set Computer Architectures for VLSI", The MIT Press, Chapter 3.2, pp. 52–64, 1986 (originally presented as a thesis in 1983).

*Primary Examiner*—James W. Moffitt
*Assistant Examiner*—Rebecca L. Rudolph
*Attorney, Agent, or Firm*—Knobbe, Martens, Olson & Bear

[57] ABSTRACT

A register architecture for a computer in which a plurality of banks of general purpose registers are used in the register files. Each of the multiple register banks is dedicated to a different user, with one of the register banks being dedicated to servicing interrupts and another of the register banks being dedicated to the operating system of the computer in which the register architecture is incorporated. Associated with each of the register banks is a smaller register bank of status registers in which information concerning the status of the computer is stored.

6 Claims, 5 Drawing Sheets

MULTIPLE SLIDING REGISTER STACKS IN A COMPUTER

This application is a continuation of U.S. patent application Ser. No. 88,616, filed Aug. 20, 1987, now abandoned.

BACKGROUND OF THE INVENTION

This invention relates to the register organization within the central processing unit of a computer. A typical prior art computer contains a number of registers within the central processing unit for the temporary storage of data. Such registers have extremely fast access times so that data stored therein can be operated on by the central processing unit at an extremely fast rate. Registers differ from computer memory in that memory lies outside the central processing unit and has slower access times. Thus, a read or write operation to or from a register requires less time than the same operation for a memory location. For example, a register-to-memory data transfer is typically on the order of five times slower than a register-to-register data transfer.

A typical prior art computer has a single register bank of general purpose registers and a number of special purpose registers also known as system and status registers. General purpose registers are generally available for any type of data storage and retrieval to a computer program currently being executed by the computer such as a word processing program or a financial spreadsheet program. Status registers are reserved for special data that indicates the status of various internal conditions of the computer. Examples of status registers are the program counter, which contains the address of the computer program currently being executed, and the processor status register, which contains data relating to the status of the central processing unit.

This single register bank of a typical prior art computer is used by many different programs, subroutines, and procedures, which are executed by the central processing unit (CPU) of the computer. The CPU can execute only one of these various programs at a time, and when one is being executed by the CPU, the single register bank is used to store data being operated on by the program. When one program needs to be executed by the computer and a different program is currently being executed, the current program needs to be interrupted and the contents of the register bank saved to memory so that the program to be executed can use the register bank. After the program is finished being executed, the original contents of the register bank are retrieved from memory and restored so that the original program can begin to be executed where it left off without losing any of its data. This saving to memory of the contents of the general purpose registers in the register bank as well as the restoration of the original contents of the general purpose registers from memory are referred to as "context switches" for purposes of this specification.

One application in which context switches are performed is in multi-user computer systems. In multi-user systems, several programs may be run on the computer "at the same time" on a round-robin basis. For example, the computer might execute a first user's program for a short period of time, then suspend the first user's program and run the second user's program for a short period of time, and so on. Since each user's program needs access to the single bank of general purpose registers, context switches are performed between the execution of one user's program and another.

There is a very real disadvantage in performing the context switches required by single register bank computers. In a context switch, the contents of the general purpose registers are either saved to memory or retrieved from memory. As explained above, register-to-memory transfers are time consuming, especially if there are a lot of general purpose registers that need to be saved or restored. In many state-of-the-art computers today, a pair of context switches takes on the order of 100 microseconds. If many context switches are required, the associated overhead time can bring a computer to its knees. Other applications in which the performance of context switches can have a disastrous effect upon the processing time of the computer include interrupt processing, and particularly interrupt processing relating to data communications.

In the above-described applications, in addition to performing context switches to save the contents of the general purpose registers, it is also necessary to save the contents of the special purpose registers, or status registers. For purposes of this specification, a "status switch" is defined to include an operation that stores the contents of the status registers to memory and an operation that retrieves from memory the original contents of the status registers. The status switches required in the above-described applications also contribute undesirably to the computer overhead time.

One approach to this problem of status switches involves the use of status registers intermingled among the general purpose registers of a single bank of registers. For example, in one register architecture, a single bank of registers is addressable by a sliding window which allows 15 general purpose registers and a single status register to be addressed at a time. The status registers, which are physically located within the bank of general purpose registers and associated with an equal number of windows of general purpose registers, are used to store the program counter, which specifies the particular instruction of the computer program currently being executed. The problem with this approach to storing status information is that status registers are physically intermingled with the general purpose registers. As a result, the status registers may be confused with the general purpose registers by an applications programmer.

SUMMARY OF THE INVENTION

A key aspect of the present invention is the provision of multiple stacks of general purpose registers in the central processing unit of a computer. Since multiple stacks of registers are available, each of the register stacks can be used by a respective program which is to be executed by the central processing unit. As a result, since each of the programs has its own register stack, when the central processing unit switches from the execution of one program to another, the current program's register stack does not need to be saved to memory because the program that is to be executed next by the CPU has its own register stack and will not alter or destroy the contents of the register stack associated with the current program. Thus, this register architecture results in very little overhead time since there is no need to perform context switches each time a different program is executed by the CPU. This multiple register stack architecture results in extremely fast operation in the data communications and multi-user applications described above as well as in other applications.

Another aspect of the invention is a novel register architecture in which status registers are dedicated exclusively to storing status information relating to the general purpose registers and are physically located outside of the general purpose registers. These dedicated status registers eliminate the overhead time required to perform status switches and thus further increase the speed of the computer.

These and other objects, features, and advantages of this invention will be apparent in view of the following detailed description of several preferred embodiments, which are explained with reference to the figures, a brief description of which is provided below.

DETAILED DESCRIPTION OF THE PREFERRED EMBODIMENT

Figure 1:
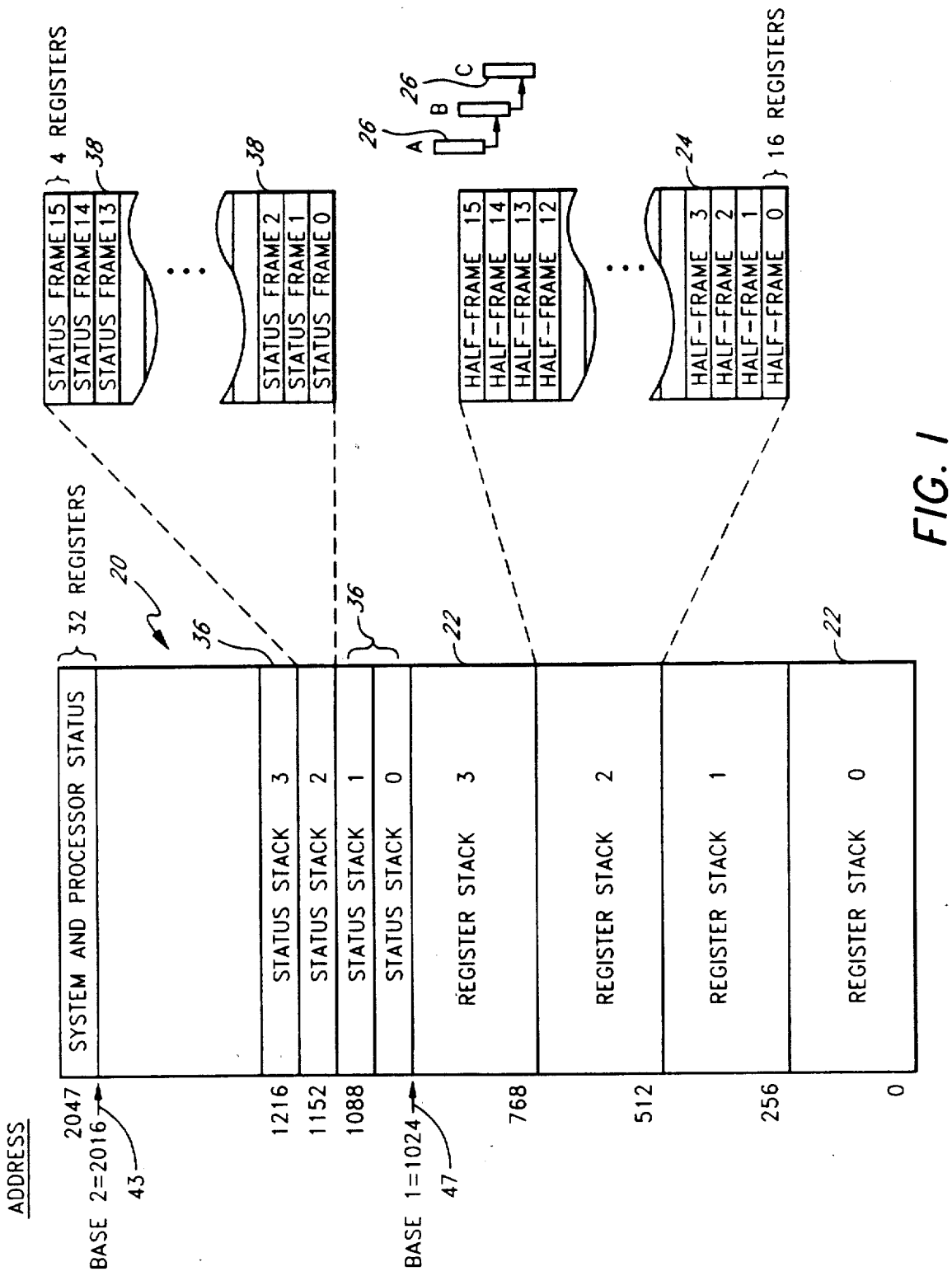
FIG. 1 is a register architecture in accordance with the invention in which four banks of general purpose registers are provided along with four banks of status registers.

A register file 20 incorporating the preferred embodiment of a register architecture in accordance with the invention is shown in FIG. 1. The register file 20, which comprises 2048 registers, includes four separate banks 22 of general purpose registers. General purpose registers, in contrast to special purpose or status registers, may be used for storing any type of data upon which a computer program is operating. These banks 22 of general purpose registers are implemented as register stacks 0–3, a register stack being a register bank in which a conventional, well known last-in/first-out type of addressing is employed. Each of the register stacks 0–3 comprises 16 "half-frames" 24 of registers, half-frame 0 through half-frame 15, as indicated on the right-hand side of FIG. 1. Each of the half-frames 24 consists of 16 registers. Thus, each of the register stacks 0–3 consists of 256 general purpose registers.

In this embodiment, each of the four register stacks 22 is used for a particular user. Register stack 0 is used exclusively for interrupt processing; register stack 1 is used exclusively for the operating system of the computer; and register stacks 2 and 3 are reserved for users of the computer in which this register architecture is incorporated. The allocation of a complete, separate bank of general purpose registers for interrupt processing is advantageous in that it reduces the likelihood of stack overflow when a relatively large number of interrupts need to be serviced. Stack overflow is undesirable since a portion of the stack must be saved to memory when overflow occurs. Of course, as explained above, memory transfers require more time and slow down the operation of the computer. If one of the four stacks were used for both interrupts and a user, for example, the likelihood of stack overflow would be increased.

The register stacks 0–3 are circularly addressable by a "sliding window" 26 that controls which registers can be addressed. At any one time, a computer program may have access to a portion of one of the register stacks 22 consisting of two adjacent half-frames 24. The sliding window 26 is conceptually shown in FIG. 1 as a rectangle 26 in three different positions, positions A, B, and C. In position A, the sliding window 26 allows the general purpose registers in the half-frames 15 and 14 to be addressed; in position B, the sliding window 26 allows the registers in the half-frames 14 and 13 to be addressed; and in position C, the window 26 allows the registers in the half-frames 13 and 12 to be addressed.

A program being executed begins using the general purpose registers in the half-frames 15 and 14 as indicated by the window 26 in position A. At certain times during the execution of the program, the window 26 "slides down" to position B to allow half-frames 14 and 13 to be addressed. One such time is when a subroutine is called by the program being executed. The subroutine will need general purpose registers for its own use, and consequently the sliding of the window 26 to position B gives the subroutine the use of the general purpose registers in the half-frames 14 and 13. After the subroutine is finished being executed, the window 26 slides back up the stack 22 to its original position A. In this example just described, the program and the subroutine are "nested," meaning that the execution of the program is temporarily interrupted while the subroutine is executed.

Nesting of a relatively large number of programs may occur. For example, a first program may be temporarily interrupted by the execution of a second program, which is itself interrupted by a third program, and so forth. When the last program is finished being executed, the execution of the previously interrupted programs is resumed. Thus, when the third program is finished being executed, the second program is resumed until it is finished being executed, and then finally the execution of the first program is resumed.

As each subsequent program is executed and the previous program is temporarily interrupted, the window 26 slides down the stack 22 one position to allocate a half-frame 24 of registers to the program about to be executed. Then, as each program resumes execution, the window 26 slides back up the stack.

It should be noted that in any two adjacent positions of the window 26 there is an overlap of one half-frame 24 of registers. For example, the registers in half-frame 14 can be addressed when the window 26 is in both positions A and B. This overlap is useful in that parameters can be passed between nested programs. For example, when a subroutine is being executed, it can leave numeric values in the half-frame 14 (when the window 26 is in position B) and when the subroutine is finished and the execution of the main program resumes (the window 26 now being in position A), the main program can retrieve the numeric values left for it in half-frame 14 by the subroutine.

Figure 3:
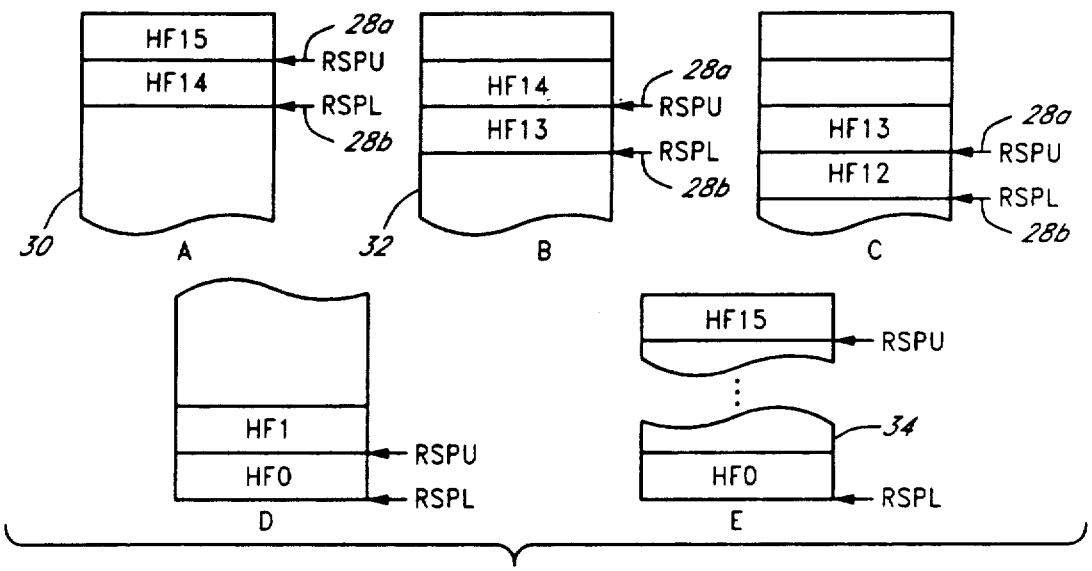
FIG. 3 is an illustration of various portions of one of the banks of general purpose registers of FIG. 1 being circularly addressed.

The conceptual window 26 is explained in more detail with reference to FIG. 3 in which a number of portions of one of the stacks 22 of general purpose registers are shown. The sliding window 26 is implemented with a pair of pointers 28 including an upper register stack pointer (RSPU) 28a and a lower register stack pointer (RSPL) 28b. Each of the register stack pointers 28 comprises a four bit binary number that specifies which of the 16 half-frames 24 of general purpose registers are to be addressed. In the leftmost stack portion 30 of FIG. 3, which corresponds to window position A in FIG. 1, RSPU points to half-frame 15 and RSPL points to half-frame 14. In the next stack portion 32, which corresponds to window position B in FIG. 1, RSPU points to half-frame 14 and RSPL points to half-frame 13. As each successive nested program is called and the window continues to slide down the stack 22, it may eventually reach the bottom of the stack 22, indicated as position D in FIG. 3 wherein RSPU points to half-frame 1 and RSPL points to half-frame 0. At this point the stack 22 is completely utilized. If another nested program is called at this point, the stack will "overflow" and the window 26 will "split," as shown in position E in the rightmost stack portion 34 of FIG. 3, and RSPL will point to half-frame 0 while RSPU points to half-frame 15. It should be noted that RSPU previously pointed to half-frame 15 when the window 26 was in position A. As a result, in order to prevent the data stored in half-frame 15 when the window 26 was in position A from being overwritten when the window 26 is in position E, the contents of half-frame 15 are stored to memory before the window 26 is shifted to prevent such data loss. If still more nested programs require that the window 26 continue to be slid down the stack 22, the two register stack pointers RSPU and RSPL move to the top of the stack 22 as shown in position A and will continue to be shifted as described above. However, before the window 26 is slid down the stack 22, the contents of each half-frame is saved to memory to prevent data loss as described above. This method of addressing the register stacks 22 is known as circular addressing.

Now referring back to FIG. 1, a bank 36 of special purpose status registers is associated with each of the register stacks 0-3. Each of the four banks 36 of status registers is also implemented as a register stack. These four status stacks 0-3 are similar in structure to the register stacks 22 in that each status stack 36 consists of 16 status frames 38, each of the status frames 38 having four registers, for a total of 64 registers in each status stack 36. As is explained in more detail below, each of the status frames 38 in the status stacks 0-3 is associated with a respective one of the half-frames 24 in the general purpose register stacks 0-3 and contains data pertaining to its associated half-frame 24. For example, the four registers in status frame 3 of status stack 0 contain data pertaining to the status of half-frame 3 of register stack 0. The register file 20 also includes 32 system and processor status registers which are used to store data pertaining to the status of the operating system and the central processing unit 4 of the computer.

Each of the 2048 registers in the register file 20 has a unique binary address beginning with zero for the registers at the bottom of the file 20 in FIG. 1 and increasing to 2047 at the top of the file 20. Specifically, the general purpose registers in register stack 0 occupy addresses 0-255; the general purpose registers in register stack 1 occupy addresses 256-511; the registers in register stack 2 occupy addresses 512-767; and the registers in register stack 3 occupy addresses 768-1023. The status registers in status stack 0 occupy addresses 1024-1087; the status registers in status stack 1 occupy addresses 1088-1151; the registers in status stack 2 occupy addresses 1152-1215; and the registers in status stack 3 occupy addresses 1216-1279. The 32 system and processor registers occupy addresses 2016-2047.

Figure 4:
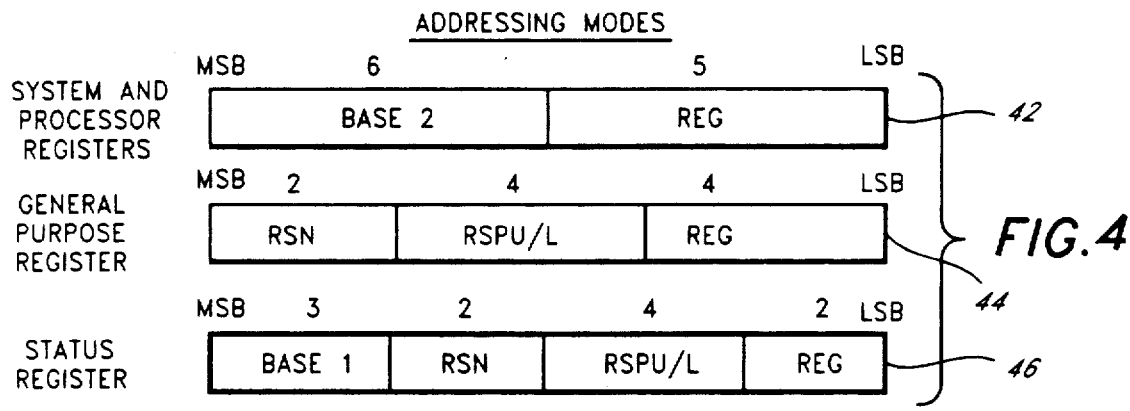
FIG. 4 is an illustration of several addressing modes of different types of registers of the register architecture of FIG. 1.

The manner in which the registers in the register file 20 are addressed is explained with reference to FIGS. 1, 3, and 4. Now referring to FIG. 4, the 32 system and processor status registers are addressed using an address configuration 42 comprising a base address BASE2 and an offset address REG. The BASE2 portion of the address 42 is a constant equal to the binary number 2016 and specifies that portion of the register file 20 containing the system and processor registers, and is indicated in FIG. 1 by the arrow 43. The offset portion REG of the address 42 is a 5 bit binary number that specifies a particular one of the 32 system and processor registers.

The general purpose registers in the register stacks 0-3 are addressed by using an address configuration 44 having three portions. The most significant portion RSN of the address 44 is the register stack number. The register stack number is a two bit binary number that specifies which of the four register stacks 22 is to be addressed. Thus, if register stack 3 is desired, RSN is set to the binary number 11. The middle portion RSPU/L of the address 44 contains one of the two four bit register stack pointers, either RSPU or RSPL, to indicate which of the 16 half-frames 24 in the desired register stack 22 are to be addressed. The REG portion of the address contains a four bit register address that specifies one of the 16 general purpose registers in one of the two half-frames 24 being addressed.

When one of the register stacks 22 is addressed, the general purpose register address 44 is constructed as follows. First, the most significant bit in the 5 bit source or destination portion of an instruction stored in an instruction register 66 is tested to see if it is a one or a zero. If it is a one, meaning that the register desired is one of the 16 registers in the higher order half-frame 24 being addressed, then the four bit RSPU is used in the RSPU/L portion of the address 44. If the most significant bit of the operand portion of the instruction is a zero, meaning that the desired register is in the lower half-frame 24, then the value of the four bit RSPL is used in the RSPU/L portion of the address 44. The remaining four bits of the operand portion of the instruction are used in the REG portion of the address to specify a particular one of the 16 registers in the half-frame 24 specified by the RSPU/L portion. When the two bit RSN portion is then added to the four bit RSPU/L portion and the four bit REG portion, the resulting 10 bit address will specify the desired general purpose register within the four stacks 22 of 1024 general purpose registers. Now referring again to FIG. 4, the status registers are addressed by an address configuration 46 having four portions. The most significant portion BASE1 of the address 46 is a base address that specifies the portion of the register file 20 in which the stacks 36 of status registers are located, and is indicated in FIG. 1 by the arrow 47. In this described embodiment, BASE1 is a binary number equal to 1024. The next most significant portion RSN of the address 46 is a two bit register stack number that specifies which of the stacks 36 of status registers is to be addressed. The next portion RSPU/L of the address 46 contains one of the two four bit register stack pointers, either RSPU or RSPL, to indicate which one of the status frames 38 is desired. As explained above, each of the status frames 38 in the status stacks 36 is associated with a respective half-frame 24 in the register stacks 22. Consequently, the RSPU/L portion of the status register address 46 is automatically set to be equal to the RSPU/L portion of the general purpose register address 44. The least significant portion REG of the address 46 is a two bit number that specifies one of the four status registers in the specified status frame 38. Thus, when the two bit RSN portion is combined with the four bit RSPU/L portion and the two bit REG portion, these eight bits specify which one of the 256 status registers is to be addressed.

Figure 2:
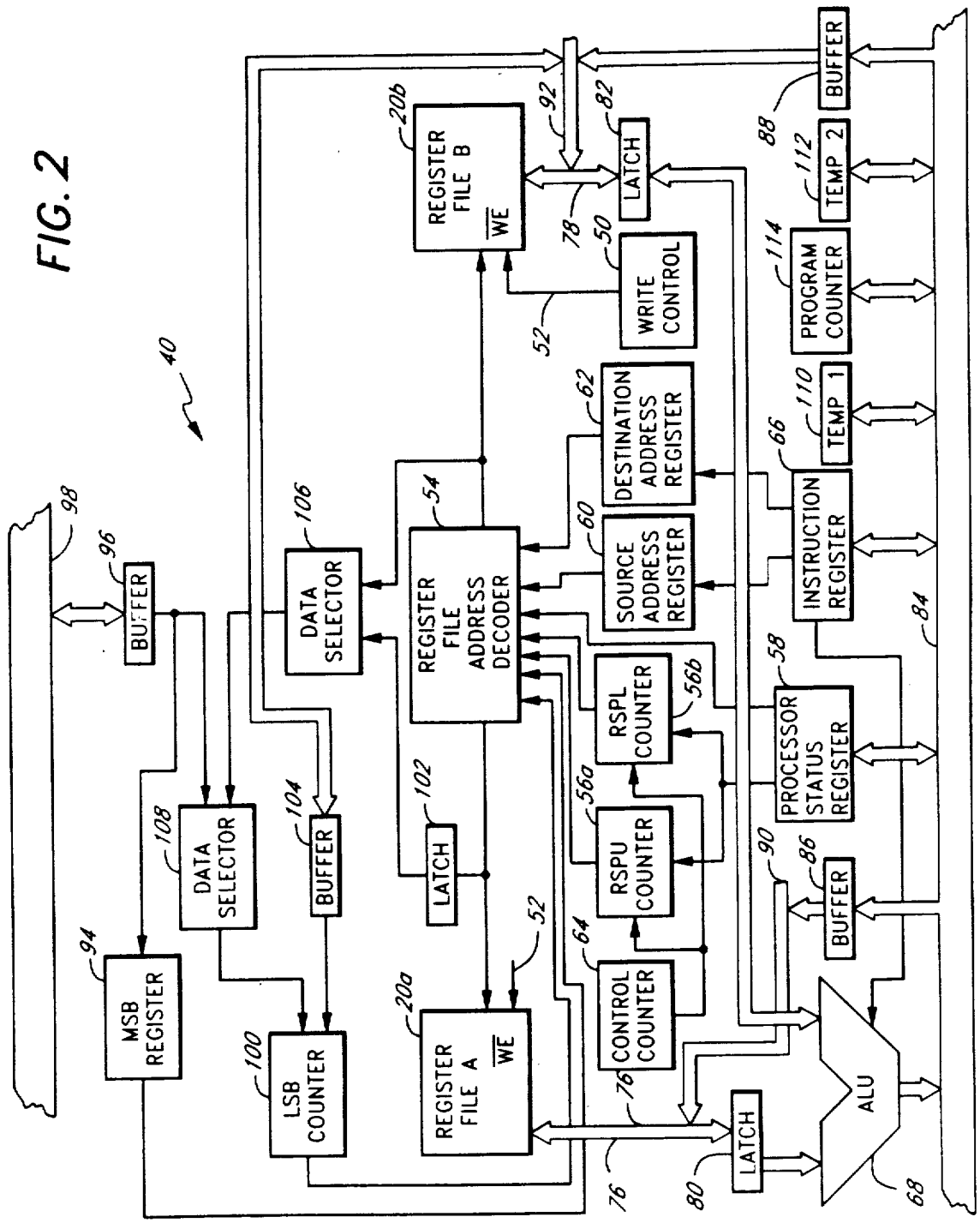
FIG. 2 is an overall schematic diagram of the register architecture of FIG. 1 as implemented in the central processing unit of a computer.

The register architecture just described is implemented in the central processing unit (CPU) 40 schematically shown in FIG. 2. The CPU includes two register files 20 of the type just described, an A register file 20a and a B register file 20b. Each of the register files 20 is an exact duplicate of the other in order to increase the processing speed of the CPU. This duplication of the register files 20, while used in the actual CPU in which this invention is embodied, is not germane to this invention. The register files 20 consist of conventional random-access memories such as those incorporated in 2016 integrated circuit chips commercially available from Motorola. A write control circuit 50 generates a write enable signal 52 that allows data to be written to each of the register files 20.

A register file address decoder 54 supplies each of the register files 20 with the addresses that specify which of the registers are to be accessed. The address decoder 54 computes these addresses from data it receives from a plurality of sources including an upper register stack pointer (RSPU) counter 56a, a lower register stack pointer (RSPL) counter 56b, a processor status register 58, a source address register 60, and a destination address register 62. Each of the RSP counters 56 comprises a four bit binary up/down counter that generates one of the RSPU and RSPL signals described above. These up/down counters may be conventional counters such as those incorporated in 25LS2569 integrated circuit chips commercially available from Advanced Micro Devices. The RSP counters 56 are connected to and receive input signals from a counter control 64 that causes the RSP counters 56 to be incremented, decremented, or loaded as may be required. The RSP counters 56 are loaded with the desired RSPU and RSPL signals from the processor status register 58. The processor status register 58 also contains the desired register stack number RSN and transmits the same to the address decoder 54 so that the desired stack 22 can be accessed. The source and destination address registers 60, 62 contain the REG portions of the system and processor register addresses 42, the general purpose register addresses 44, and the status register addresses 46, all as described above. These REG portions of the foregoing addresses 42, 44, 46 are transmitted by a conventional instruction register 66.

Figure 6:
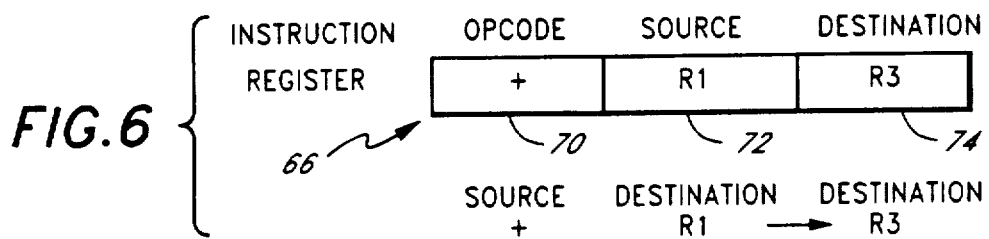
FIG. 6 is an illustration of one of the formats of an instruction register used in the preferred embodiment.

The instruction register 66 contains a program instruction that is to be executed by the CPU 40. The program instruction comprises an operation code, a source address, and a destination address. The operation code, which is transmitted to a conventional arithmetic logic unit (ALU) 68, specifies what operation, for example addition or subtraction, the ALU 68 is to perform. The source and destination addresses specify which registers are to be operated on. Now referring to FIG. 6, the contents of the instruction register 66 are shown to include by way of example an operation code 70 specifying addition, a 5-bit source address 72 specifying register 1 of a particular half-frame 24 and a 5-bit destination address 74 specifying register 3 of the half-frame 24. This instruction will cause the contents of register 3 to be added to the contents of register 1 and the result placed in register 3.

Data is transferred into and out of the register files 20 by a pair of data buses 76, 78. Each of the buses 76, 78 is connected to a respective latch 80, 82 which is in turn connected to the ALU 68. The ALU is conventional and may comprise SN54LS381A, SN54LS382, or similar integrated circuit chips commercially available from Texas Instruments of Dallas, Tex. The ALU 68 is connected to a bus 84 that is in turn connected to two data buffers 86, 88 which are connected to a bus 90 and a bus 92, respectively. These two buses 90, 92 are connected to transmit data back into the register files 20. The ends of the buses 90, 92 are shown broken off since in fact they continue on to supply data to other circuits in the computer such as the memory, input/output modules that interface with peripheral devices, etc. The particular bus configuration shown is not important to the practice of the invention, and many other bus configurations could be used.

The portion of FIG. 2 above the register files 20 and the address decoder 54 is a schematic diagram of additional circuitry that enables additional flexibility in the addressing of the register files 20. It should be noted that all of the inputs to the register file address decoder 54 described thus far have been transmitted directly or indirectly from the processor status register 58 and the instruction register 66. Thus, as described thus far, register addresses may be specified only by the combination of the contents of these two registers 58, 66. The upper portion of FIG. 2 provides flexibility in the addressing of the registers since it allows register addresses to be specified by sources other than the combination of the processor status register 58 and the instruction register 66.

Now referring to the upper portion of FIG. 2, a most significant bit (MSB) register 94 is connected to the register file address decoder 54 and provides the seven most significant bits of a desired register file address to the register file address decoder 54. These seven most significant bits are supplied to the MSB register 94 by a buffer 96 connected to a bus 98. The MSB register 94 may comprise a 74ALS574 integrated circuit chip commercially available from National Semiconductor, and the buffer 96 may comprise a pair of 74ALS245 integrated circuit chips also available from National Semiconductor. The bus 98 is connected to various other circuits in the computer and can transmit register addresses specified by these circuits to the MSB register 94 via the buffer 96. The remaining four least significant bits of a register address are supplied to the register file address decoder 54 by a least significant bit (LSB) counter 100, which may comprise a 25LS2569 integrated circuit chip commercially available from Advanced Micro Devices. Thus, the combination of the outputs of the MSB register 94 and the LSB counter 100 provides a complete register address and an alternative way to address the register files 20.

The LSB counter 100 may be loaded with its portion of the desired register address from any one of four address sources including a latch 102, the register file address decoder 54, the buffer 96, and a buffer 104. The latch 102, which may be a 74ALS574 integrated circuit chip available from National Semiconductor, is connected to the output of the register file address decoder 54 that is transmitted to the A register file 20a. Both the A register file 20a and the latch 102 receive the four least significant bits of the A register file address transmitted by the register file address decoder 54. The latch 102 is connected to the first input of a data selector 106 having a second input that is connected to the output of the register file address decoder 54 that is transmitted to the B register file 20b. Both the B register file 20b and the data selector 106 receive the four least significant bits of the B register file address transmitted by the register file address decoder 54. The data selector 106 selects either one of its two four-bit inputs described above for transmission to the first input of a second data selector 108. The data selectors 106, 108 may comprise 74ALS257 integrated circuit chips available from National Semiconductor. The second input of the data selector 108 is coupled to receive the four least significant bits of a register address from the buffer 96 connected to the bus 98, and the data selector 108 outputs either one of its two four-bit inputs. The LSB counter 100 receives as input either the output of the second data selector 108 or the buffer 104. The buffer 104 is connected to the bus 92 and may receive address signals in a manner similar to that described in connection with the buffer 96. A single output enable signal (not shown) is provided to both the buffer 104 and the data selector 108. The data selector 108 is enabled only when the output enable signal is low, and the buffer 104 is enabled only when the output enable signal is high. As a result, at any time, the output of either the buffer 104 or the data selector 108 is transmitted to the LSB counter 100, but never both.

A number of specialized registers unrelated to the addressing of the register files 20 are incorporated into the CPU 40. A temporary data register (TEMP1) 110 and a second temporary data register (TEMP2) 112 are connected to the bus 84. As described in connection with the operation of this embodiment, the register 110 serves as a temporary storage location for a vector used in connection with an interrupt subroutine. The register 112 serves as a temporary storage location for the contents of the processor status register 58. Another specialized register 114 is reserved for the storage of the program counter, which specifies the address of the next program instruction to be executed by the CPU.

OPERATION OF THE PREFERRED EMBODIMENT

During the operation of a computer incorporating the register architecture of the preferred embodiment of the invention just described, the execution of a number of different programs may be switched from one program to another program extraordinarily rapidly because of the multiple sliding register stack architecture. This rapid switching entails switching from one stack 22 of general purpose registers to another as well as sliding up and down each of the stacks 22 to allow nested programs to be executed. Nested programs are executed extraordinarily rapidly because only a few very quick register-to-register transfers of data are required to slide up or down the each of the four stacks 22, and no slower register-to-memory transfers are required. In addition, when register stacks 22 are switched, there are some register-to-memory transfers of data, but these involve only status registers and are kept to a minimum, and no general purpose registers are saved to memory. Thus, this multiple stack architecture allows for much faster execution of programs since whole banks of general purpose registers do not need to be saved to memory as in typical prior art computers.

As indicated above, the contents of a number of status registers are saved to the status stacks 36 when the sliding window slides down the register stacks 22, and the contents of some additional status registers are saved to memory when the CPU switches from one register stack 22 to another. The configuration and contents of some of these status registers are explained in order to more thoroughly understand the reason for the procedures described below. However, it should be emphasized that the particular configuration and contents of the status registers about to be described is unimportant to the invention. Different computers have different status registers and formats for status registers, depending upon the detailed internal configuration of the computer and its operating system. It is important to the practice of the invention only that those status registers that need to be saved in order to preserve the current status of the system are in fact saved, for example, before register stacks are switched. With this understanding, the configuration and contents of a number of status registers used in this preferred embodiment are described below.

The program counter register 114 is a status register which is used universally in computers and is well known to those skilled in the art. The program counter stored in the register 114 is a binary number that is the address of a program instruction being executed or about to be executed by the CPU.

Figure 5:
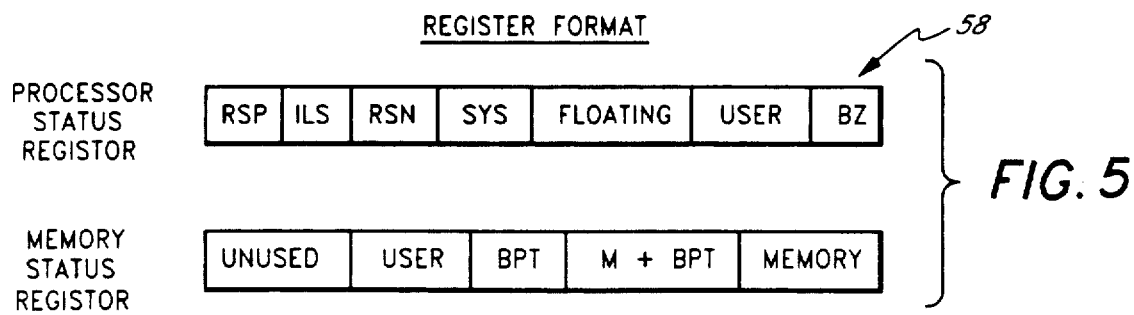
FIG. 5 is an illustration of the register formats of two status registers of used in the preferred embodiment of the invention.

Another status register used in this embodiment is the processor status register 58. Now referring to FIG. 5, the configuration of this register 58 consists of seven portions. A first portion RSP is the register stack pointer, which specifies a particular one of the half-frames 24 of register stacks 22. This portion of the processor status register 58 is used to load the RSPU and RSPL counters 56a, 56b. The next portion ILS of the processor status register 58 contains the interrupt level status of the computer, which is used to indicate the priority level of the current interrupt being serviced by the CPU. The next portion RSN is supplied from the processor status register 58 directly to the address decoder 54 and specifies which of the four register stacks 22 will be addressed. Another portion SYS of the register 58 contains information relating to the status of the operating system of the computer. The next portion FLOATING contains information relating to the status of the floating point system of the computer. The next portion USER contains information relating to the status of the current user of the computer. The final portion BZ contains status information relating to whether the current output of the ALU 68 is zero. Another register, the system status register, has the exact same configuration as the processor status register just described. The system status register is one of the 32 system and processor status registers located at BASE2 in the register files 20 as indicated by the arrow 43 in FIG. 1 and is programmable by the user of the computer. As is described in more detail below, the contents of the system status register may be written to the processor status register 58 to change the status of the computer, for example, to switch register stacks 22.

The configuration of the memory status register, which is another one of the 32 system and processor registers beginning at the BASE2 portion of the register files 20 shown in FIG. 1, includes a first portion that is not currently used by the computer. The second portion USER contains status information relating to the status of the current user of the computer. The BPT portion of the memory status register contains status information relating to breakpoint traps, which are used primarily for "debugging" computer programs and cause the execution of the program being debugged to temporarily halt at a selected instruction. The next portion M & BPT contains information relating to both breakpoint traps and the memory of the computer, and the final portion MEMORY of the memory status register contains information relating to the current status of the memory.

The remaining status registers of the 32 system and processor registers located at the BASE2 portion of the register files as indicated in FIG. 1 contain additional information about the status of the register files 20, the memory and operating system of the computer, etc., the particular details of which are not germane to this invention.

Of the status registers described above, the only one that needs to be saved in the case of a shift of the sliding window 26 up or down one of the stacks 22 is the program counter register 114, which is saved to a shadow stack as described in detail below. In the case of an interrupt, in order to preserve the status of the system, the program counter register 114, the processor status register 58, and the memory status register need to be saved, and they are saved to three status registers in one of the status frames 38 in the status stack 36 associated with the register stack 22 being used. Finally, in the case of a stack switch, these last three registers just mentioned are saved to one of the status frames 38, and the 32 system and processor registers are saved to memory.

The rapid stack-switching and stack-sliding operation of the four register stacks 22 and the status stacks 36 described generally above is explained below in connection with three commonly used procedures in which the register stacks 22 are switched and in which the sliding window 26 slides up and down the stacks 22. In the first procedure, a program being executed by the CPU and using the general purpose registers in two adjacent half-frames 24 of one of the four register stacks 22 calls another program, for example, a subroutine. Before the subroutine begins execution, certain status information relating to the calling program is stored in a status register in the status stack 36 associated with the register stack 22 being used.

Figure 7:
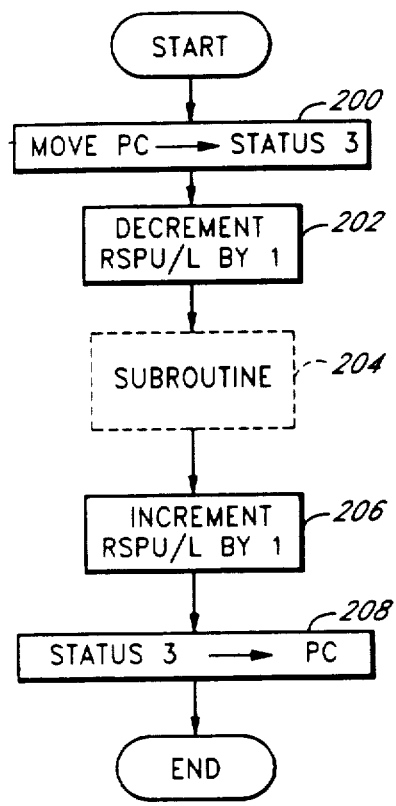
FIG. 7 is a flowchart of the operation of the preferred embodiment of the invention as used in one procedure.

For purposes of explaining this first procedure, assume that register stack 2 is being used by the CPU, although this procedure is applicable to all four register stacks. Also assume that the general purpose registers of half-frames 14 and 13 are being used by the calling program. Making these two assumptions, at the beginning of this first procedure, the sliding window 26 will occupy position B as indicated in FIG. 1. Now referring to FIG. 7, at step 200, the contents of the program counter register 114 are stored in the uppermost of the four status registers of the status frame 38 associated with the half-frame 24 that was being used by the calling program. This step 200 is accomplished by the register file address decoder 54 generating the desired status register address 46, which in this case includes the binary number 010 in the BASE1 portion of the address 46, the two bit binary number 10 to represent register stack 2 from the processor status register 58 in the RSN portion of the address 46, the binary number 1110 to represent status frame 14 in the RSPU/L portion of the address 46 as selected by the address decoder 54 from the RSPU output supplied by the RSPU counter 56a, and the binary number 11 in the REG portion of the address 46 from the instruction register 66 via the destination register 62 to specify the status register 3 in the status stack. Next, at step 202, the sliding window 26 is moved down the register stack 2 to position B as indicated in FIG. 1 so that the subroutine will access the two half-frames 13 and 12. This is accomplished by decrementing the values of RSPU and RSPL in the RSP counters 56 so that the lower two half-frames 13 and 12 will be specified for all addresses generated by the subroutine. Decrementing the RSP counters 56 is accomplished by the counter control circuit 64 which causes each of the counters 56 to count down a single count.

After the sliding window 26 has slid down the stack one position, at step 204, the subroutine will be executed by the CPU and will access the general purpose registers in half-frames 13 and 12. When the subroutine is finished being executed, the sliding window 26 will slide back up the register stack 2 so that the program that called the subroutine has access to the general purpose registers of half-frames 14 and 13 that it was using. This is accomplished at step 206, at which the counter control 64 causes the RSPL and RSPU counters 56 to be incremented by one. Finally, before the execution of the calling program can resume, the program counter register 114 which contains the address of the next instruction of the calling program to be executed must be retrieved from status frame 14 of the status stack 2 in which it was previously stored. This is accomplished at step 208 at which the same address 46 that was used to originally store the program counter in status stack 2 is used to retrieve the program counter and replace it in the program counter register 114. At this point the execution of the calling program resumes.

In a second procedure, an interrupt temporarily interrupts the execution of the currently running program so that an interrupt service routine may be executed. In this preferred embodiment, as mentioned above, register stack 0 is dedicated exclusively to servicing interrupts in order to minimize the occurrences of stack overflow. Interrupt subroutines may be nested just as other programs may be nested. The following description of this second procedure assumes that the CPU is currently executing an interrupt subroutine when another interrupt is generated. As a result, since the CPU is already operating on the register stack 0 which is dedicated to interrupts, no register stack switch is necessary. However, putting this assumption aside for the moment, if the CPU is operating on a register stack 22 other than the interrupt stack 0, then a register stack switch must be made to the interrupt stack 0 before the second procedure described below is invoked. With this understanding, the second procedure is explained below assuming that the CPU is currently operating on half-frames 3 and 2 of register stack 0 when the second procedure is invoked, although of course the CPU could be operating using other half-frames of register stack 0.

Figure 8:
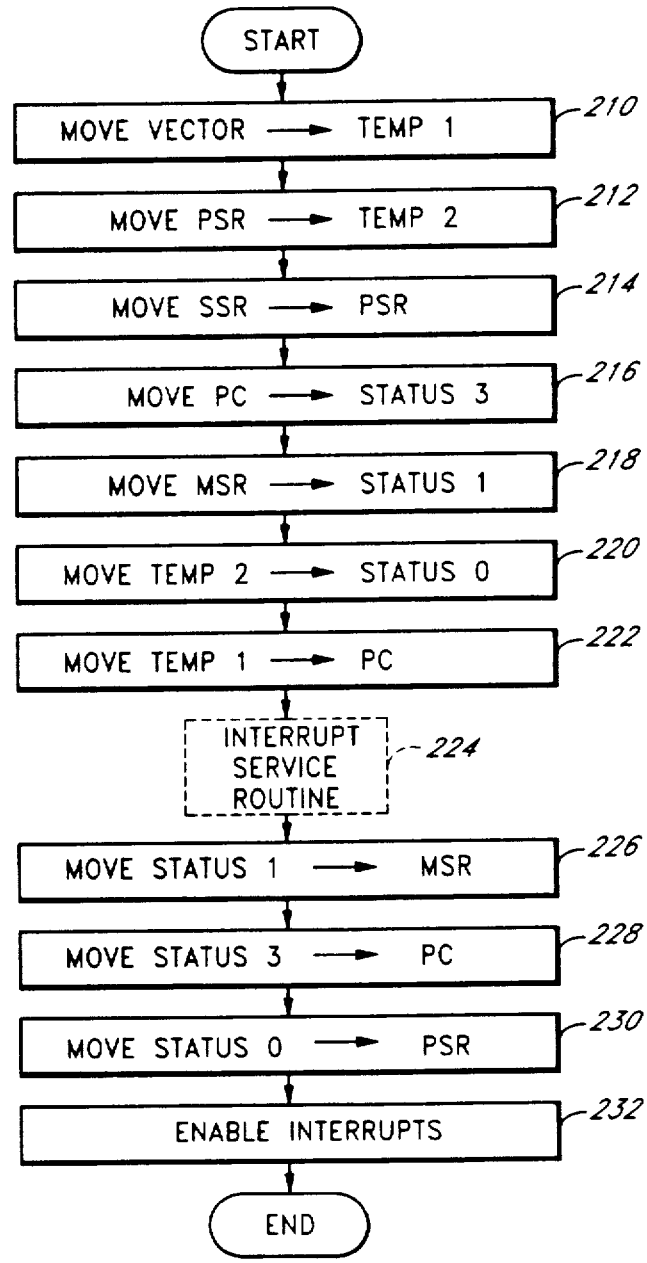
FIG. 8 is a flowchart of the operation of the preferred embodiment of the invention as used in a second procedure.

Now referring to FIG. 8, at the start of the second procedure, an interrupt has been generated and transmitted to the CPU. The interrupt includes a vector that specifies the address of the interrupt service routine associated with the interrupt that is to be executed by the CPU. At step 210, this address vector is stored in the temporary register 110. At step 212, the contents of the processor status register 58 are stored in the temporary register 112 because the contents of the processor status register 58 will be overwritten in a subsequent step and the original contents must be saved. At step 214, the contents of the special status register in the register files 20 are stored in the processor status register 58. As explained above, the special status register has the same configuration as the processor status register, except that in this case the RSP in the special status register is one less than the RSP in the processor status register. Thus, this step 214 causes the sliding window to move from half-frames 3 and 2 down to half-frames 2 and 1.

Next, at steps 216-220, the contents of the program counter register 114, the memory status register, and the processor status register are saved in three of the four status registers in the status frame 2 of the register stack 0 associated with half-frame 2 of register stack 0. This is accomplished by formulating the appropriate status register addresses 46. In this particular example, these addresses 46 are formed by the address decoder 54 which transmits to the register files 20 the binary number 010 in the BASE1 portion of the address 46, the binary number 00 in the RSN portion of the address 46 to specify status stack 0, the binary number 0010 in the RSPU/L portion of the address to specify status frame 2, and the particular two-bit register portion REG. Note that the contents of the processor status register are moved from the temporary storage register TEMP2 112 where they were previously saved at step 212. Next, at step 222, the address vector specifying the address of the starting location of the interrupt subroutine is moved to the program counter register 114, and the interrupt subroutine is executed at step 224.

After the interrupt subroutine is finished being executed, at steps 226-230, the original contents of the memory status register, the program counter register 114, and the processor status register 58 are retrieved from the status registers by specifying the same status register addresses 46 described above. Finally, at step 232, interrupts are enabled so that they may interrupt the execution of the CPU as explained in more detail below.

There are two modes of operation of the register stack 0 dedicated to interrupts. In the mode of operation described above, nesting of interrupt subroutines is allowed. This is accomplished by setting an interrupt enable control bit in the special status register. The corresponding control bit in the processor status register 58, which has the same configuration as the special status register, is reset so that interrupt nesting is not allowed in the default mode of operation. The user may override this default mode by setting the interrupt enable control bit as described above. Step 232 assumes that the default mode of operation is being used and that interrupts have been disabled, and thus, they need to be enabled again since the interrupt subroutine is finished being executed.

Figure 9:
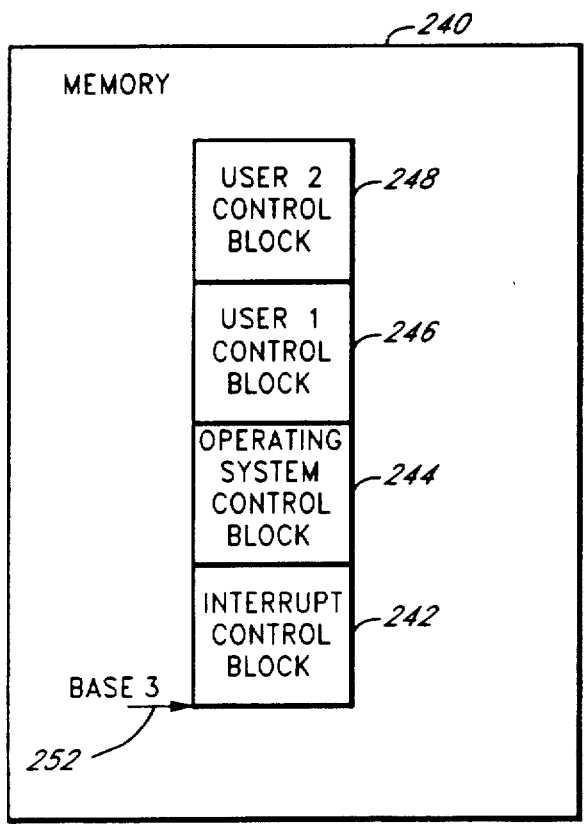
FIG. 9 is an illustration of a portion of memory with four status control blocks.
Figure 9:
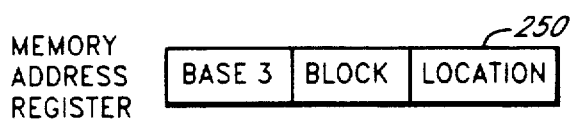

The third procedure, which accomplishes a register stack 22 switch, requires an additional step of saving to memory the 32 system and processor registers located in the BASE2 portion of the register files 20. Now referring to FIG. 9, a portion of the memory 240 of a computer in which the register architecture of the invention is embodied includes four status control blocks 242, 244, 246, 248. Each of the control blocks is reserved for the storage of status information which includes the information contained in the 32 system and processor registers as well as additional information. Each of the four control blocks is associated with a different user: a first control block 242 is dedicated to storing status information relating to interrupts; a second control block 244 is dedicated to storing status information concerning the operating system of the computer; a third control block 246 is dedicated to a first user; and a fourth control block 248 is dedicated to a second user.

The four memory control blocks 242, 244, 246, 248 are addressed using a memory address 250 having a first portion BASE3 indicated by an arrow 252 that specifies the portion of memory in which the four control blocks 242, 244, 246, 248 reside. The second portion BLOCK of the address 250 is a two bit binary number specifying a particular one of the four control blocks 242, 244, 246, 248. The third portion LOCATION of the address 250 includes a 6-bit binary number specifying a particular memory location in the control block specified. This 6-bit binary number allows for 64 memory locations in each of the control blocks 242, 244, 246, 248. Of course, a different number of memory locations could be provided in each of the control blocks.

Figure 10:
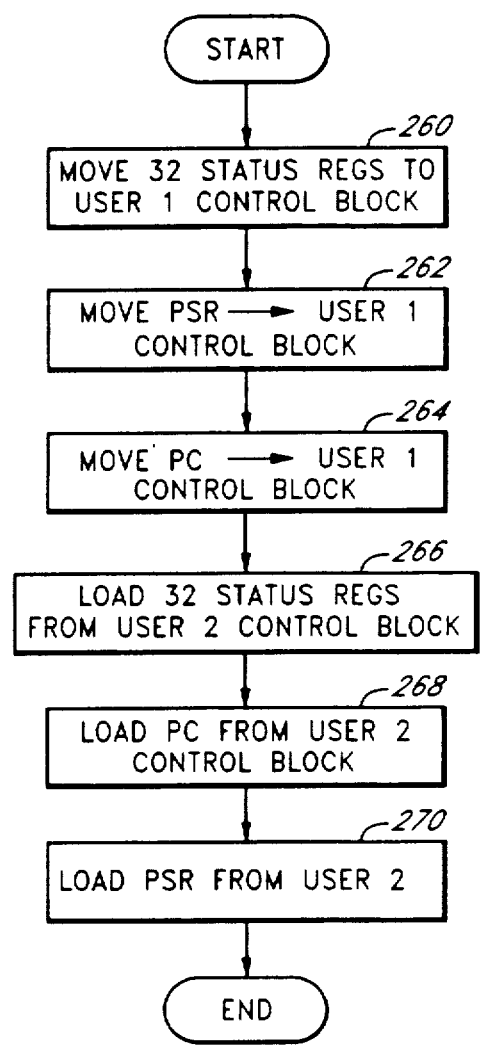
FIG. 10 is a flowchart of the operation of the preferred embodiment of the invention as used in a third procedure.

Now referring to FIG. 10, this register stack switch procedure is explained with the assumption that the execution of the program of a first user USER1 using register stack 1 is switched to the execution of a second program of a second user USER2 using register stack 2. Accordingly, at step 260, the contents of the 32 system and processor status registers located at the BASE2 portion of the register files 20 are saved to the USER1 control block 246. Next, at steps 262-264, the processor status register 58 and the program counter are saved to the USER1 control block 246 in the memory 240. At this point, the complete status relating to the execution of the first user's program is saved in memory and the corresponding status information relating to the second user can be retrieved from memory and stored in the register files 20 so that the execution of the second user's program may begin. To this end, at step 266, the 32 system and processor status registers in the register files 20 are loaded from the USER2 control block 248. At step 268, the program counter register 114 is loaded from the USER2 control block 248, and at step 270, the processor status register 58 is loaded from the USER2 control block 248.

Modifications and alternative embodiments of the invention will be apparent to those skilled in the art in view of the foregoing description. Accordingly, this description is to be construed as illustrative only, and is for the purposes of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A register architecture for a central processing unit of a computer which reduces computer overhead by decreasing the number of times the contents of a set of registers are saved to a memory of said computer, said register architecture comprising:

a plurality of stacks of general purpose registers, each stack of general purpose registers being a sliding register stack having an addressable window which slides along said stack to provide at least one register that is addressable from two adjacent positions of said addressable window, said addressable window defining a first range of addresses that address a first set of registers in said sliding register stack and defining a second range of addresses that address a second set of registers in said sliding register stack, the address of said at least one register being within both said first and second ranges of addresses, said first and second ranges of addresses redefinable when said window slides;

a first sliding stack of said plurality of stacks of general purpose registers in said central processing unit of said computer dedicated to a first computer user, said first stack storing data associated with programs executed by said central processing unit when controlled by said first user, said addressable window sliding in response to the execution of instructions by said central processing unit when said central processing unit is controlled by said first user;

a second sliding stack of said plurality of stacks of general purpose registers in said central processing unit of said computer dedicated to a second computer user, said second stack storing data associated with programs executed by said central processing unit when controlled by said second user, said addressable window sliding in response to the execution of instructions by said central processing unit when said central processing unit is controlled by said second user;

a third sliding stack of said plurality of stacks of general purpose registers in said central processing unit of said computer dedicated to the operating system of said computer, said third stack storing data associated with operating system programs executed by said central processing unit, said addressable window sliding in response to the execution of instructions by said central processing unit when said central processing unit is controlled by said operating system;

a fourth sliding stack of said plurality of stacks of general purpose registers in said central processing unit of said computer dedicated to handling interrupts, said fourth stack storing data associated with interrupt handling programs executed by said central processing unit, said addressable window sliding in response to the execution of instructions by said central processing unit when said central processing unit is handling interrupts; and means for automatically selecting a respective one of said first, second, third and fourth stacks as a currently enabled stack when said computer is executing a respective one of a program of said first computer user, a program of said second computer user, an operating system program and an interrupt handling program, said selecting means selectively disabling one of said first, second, third and fourth stacks when enabling said currently enabled stack, the data in said one stack remaining unchanged therein while disabled and being immediately available when said one stack is currently enabled, thereby reducing the overhead required to switch execution from one of said programs to another of said programs.

2. A register architecture for a computer comprising:

a first register bank of general purpose registers dedicated to storing data associated with a first user program;

a first special purpose register associated exclusively with said first register bank, said first special purpose register storing information about the status of said computer when executing said first user program;

a second register bank of general purpose registers dedicated to storing data associated with a second user program;

a second special purpose register associated exclusively with said second register bank, said second special purpose register storing information about the status of said computer when executing said second user program;

a third register bank of general purpose registers dedicated to storing data associated with an operating system program of the computer;

a third special purpose register associated exclusively with said third register bank, said third special purpose register storing information about the status of said computer when executing said operating system program;

a fourth register bank of general purpose registers dedicated to storing data associated with a program for handling interrupts;

a fourth special purpose register associated exclusively with said fourth register bank, said fourth special purpose register storing information about the status of said computer when executing said program for handling interrupts; and means for selectively enabling a respective one of said first, second, third and fourth register banks and a respective one of said first, second, third and fourth special purpose registers in accordance with the program being executed by said computer, said means enabling said first register bank and said first special purpose register when said computer is executing said first user program;

said means enabling said second register bank and said second special purpose register when said computer is executing said second user program;

said means enabling said third register bank and said third special purpose register when said computer is executing said operating system program; and said means enabling said fourth register bank and said fourth special purpose register when said computer is executing said interrupt handling program, wherein each of said register banks comprises a register stack, and wherein each of said register stacks is a sliding register stack having an addressable window which slides along said register stack in response to the execution of instructions by said central processing unit to provide at least one register that is addressable from two adjacent positions of said addressable window, said addressable window defining a first range of addresses that address a first set of registers in said sliding register stack and defining a second range of addresses that address a second set of registers in said sliding register stack, the address of said at least one register being within both said first and second ranges of addresses, said first and second ranges of addresses redefinable when said window slides.

3. A register architecture for a central processing unit of a computer which reduces computer overhead by decreasing the number of times the contents of a set of registers are saved in said computer, said register architecture comprising:

a plurality of banks of general purpose registers, each bank of general purpose registers being a sliding register stack having an addressable window which slides along said stack to provide at least one register that is addressable from two adjacent positions of said addressable window, said addressable window defining a first range of addresses that address a first set of registers in said sliding register stack and defining a second range of addresses that address a second set of registers in said sliding register stack, the address of said at least one register being within both said first and second ranges of addresses, said first and second ranges of addresses redefinable when said window slides;

a first bank of said plurality of banks of general purpose registers for storing data relating to a first task performed by a first program being executed by said computer, said addressable window sliding in response to the execution of instructions in said first program by said central processing unit;

a first special purpose register associated exclusively with said first bank of general purpose registers, said first special purpose register storing information about the status of said computer when executing said first program;

a second bank of said plurality of banks of general purpose registers for storing data relating to a second task performed by a second program executed by said computer, said addressable window sliding in response to the execution of instructions in said second program by said central processing unit; and a second special purpose register associated exclusively with said second bank of general purpose registers, said second special purpose register storing information about the status of said computer when executing said second program, the status of one of said first and said second special purpose registers being changed when said computer switches its execution from the program of one of said tasks to the program of the other of said tasks, said first bank of general purpose registers selectively enabled when said computer switches its execution to said first task and said second bank of general purpose registers selectively enabled when said computer switches its execution to said second task, the data stored in said first bank of general purpose registers relating to said first task remaining unchanged while said second task is active so that said data relating to said first task is immediately available when said first task again becomes active, and the data stored in said second bank of general purpose registers relating to said second task remaining unchanged while said first task is active so that said data relating to said second task is immediately available when said second task again becomes active, thereby reducing the overhead required to switch between said first and second tasks.

4. A register architecture for a computer which reduces computer overhead by decreasing the number of times the contents of a set of registers are saved in said computer, said register architecture comprising:

a sliding register stack of general purpose registers, said sliding stack having an addressable window which slides along said register stack to occupy a plurality of positions along said stack, each of said positions corresponding to a range of addresses for the general purpose registers in said sliding register stack, each of said positions further corresponding to a particular program portion being executed by said computer, said general purpose registers storing data for the program portion corresponding to each said position of said addressable window; and a plurality of status registers which store information relating to the status of said computer when executing program portions associated with said ranges of address for the general purpose registers in said sliding register stack, said status registers being located outside of said stack of general purpose registers, said computer operating to change said position of said addressable window in response to a change in the program portion executed by said computer, the data in said general purpose registers addressed by a first position of said addressable window remaining unchanged when said addressable window is in a second position independent of said first position so that when said addressable window again addresses said first position, the data stored in said general purpose registers addressed by said first position are immediately available, thereby reducing the overhead required in switching from said second position back to said first position.

5. A register architecture for a computer which reduces computer overhead by decreasing the number of times the contents of a set of registers is saved in said computer, said register architecture comprising:

a first sliding register stack of general purpose registers, said first sliding stack having a first addressable window which slides along said first register stack to occupy a plurality of positions along said first stack, each of said positions corresponding to a range of addresses for the general purpose registers in said first sliding register stack, each of said positions further corresponding to a particular program portion being executed by said computer when said first sliding register stack is enabled, said general purpose registers storing data used by said particular program portions associated with said positions;

a plurality of first status registers which store information relating to the status of said computer when said first sliding register stack is enabled, said first status registers being located outside of said first sliding register stack, each of said first status registers being associated exclusively with a respective one of said positions of said first addressable window and storing information relating to the status of said computer when executing said particular program portion associated with said respective one of said positions of said first addressable window;

a second sliding register stack of general purpose registers, said second sliding stack having a second addressable window which slides along said second register stack to occupy a plurality of positions along said second stack, each of said positions corresponding to a range of addresses for the general purpose registers in said second sliding register stack, each of said positions further corresponding to a particular program portion being executed by said computer when said second sliding register stack is enabled, said general purpose registers storing data in locations addressed by said range of addresses, said data used by said particular program portions associated with said positions; and a plurality of second status registers which store information relating to the status of said computer when said second sliding register stack is enabled, said second status registers being located outside of said second sliding register stack, each of said second status registers being associated exclusively with a respective one of said positions of said second addressable window and storing information relating to the status of said computer when executing said particular program portion associated with said respective one of said positions of said second addressable window, said computer operating to selectively disable one of said first and second sliding register stacks and to enable the other of said first and second sliding register stacks, the data in said first sliding register stack remaining unchanged when said second sliding register stack is enabled so that said data in said first sliding register stack is immediately available when said first sliding register stack is enabled, the data in said second sliding register stack remaining unchanged when said first sliding register stack is enabled so that said data in said second sliding register stack is immediately available when said second sliding register stack is enabled, thereby reducing the overhead required in disabling one of said stacks and enabling the other of said stacks.

6. A register architecture for a computer which reduces computer overhead by decreasing the number of times the contents of a set of registers is saved in said computer, said register architecture comprising:

a sliding register stack of general purpose registers, said sliding stack having an addressable window which slides along said register stack to occupy a plurality of positions along said stack, each of said positions corresponding to a range of addresses for the general purpose registers in said sliding register stack, each of said positions further corresponding to a particular program portion being executed by said computer when said sliding register stack is enabled, said general purpose registers storing data in locations addressed by said range of addresses, said data used by said particular program portions associated with said positions; and a plurality of status register banks each comprising a plurality of status registers which store information relating to the status of said computer when said sliding register stack is enabled, each of said status register banks being associated exclusively with a respective one of said positions of said addressable window and storing information relating to the status of said computer when executing said particular program portion associated with said respective one of said positions of said addressable window, the data in said general purpose registers addressed by a first position of said addressable window remaining unchanged when said addressable window is in a second position independent of said first position so that when said addressable window again addresses said first position, the data stored in said general purpose registers addressed by said first position is immediately available, thereby reducing the overhead required in switching from said second position back to said first position.

* * * * *